United States Patent [19]

Engel

[11] Patent Number: 5,047,185
[45] Date of Patent: Sep. 10, 1991

[54] METHOD OF PRODUCING MOLDINGS

[76] Inventor: Rudolf Engel, Michael-Steinherr-Str. 17, D-8904 Friedberg, Fed. Rep. of Germany

[21] Appl. No.: 381,668
[22] PCT Filed: Dec. 7, 1988
[86] PCT No.: PCT/EP88/01111
§ 371 Date: Jul. 5, 1989
§ 102(e) Date: Jul. 5, 1989
[87] PCT Pub. No.: WO89/05222
PCT Pub. Date: Jun. 15, 1989

[30] Foreign Application Priority Data

Dec. 9, 1987 [DE] Fed. Rep. of Germany ....... 3741689

[51] Int. Cl.$^5$ .............................................. C04B 35/76
[52] U.S. Cl. ........................................ 264/60; 264/517
[58] Field of Search ................................. 264/60, 517

[56] References Cited

U.S. PATENT DOCUMENTS

| 1,671,893 | 5/1928 | Black | 52/576 |
| 3,300,331 | 1/1967 | Collins | 264/60 |
| 3,604,077 | 9/1971 | Rath | 18/4 |
| 3,615,983 | 10/1971 | Palfreyman | 156/173 |
| 4,158,687 | 6/1979 | Yajima et al. | 264/60 |
| 4,401,841 | 8/1983 | Meyer | 174/31 R |
| 4,671,911 | 6/1987 | Garnier | 264/60 |
| 4,683,118 | 7/1987 | Hayashi | 264/60 |

FOREIGN PATENT DOCUMENTS 0209320 1/1987 European Pat. Off. .
2525085 12/1975 Fed. Rep. of Germany .
3606052 7/1986 Fed. Rep. of Germany .

OTHER PUBLICATIONS

Patent Abstract of Japan, vol. 7, No. 203 (M-241) (1348) Sep. 8, 1983.

Primary Examiner—James Derrington
Attorney, Agent, or Firm—Edwin D. Schindler

[57] ABSTRACT

In the production of moldings from ceramic material with embedded reinforcement a high surface quality and a systematic improvement of strength and toughness may be achieved if the reinforcement is in the form of a stiff, three-dimensional supporting skeleton (13) with a geometry adapted to the molding geometry and which prior to filling of the mold cavity with ceramic material is fixed in the mold cavity with the aid of a holding bar (9) and has a structure which is formed by reinforced C-fiber mats and which is pervious to ceramic material introduced into the mold cavity by abrupt evacuation thereof.

22 Claims, 4 Drawing Sheets

FIG 1
FIG 2
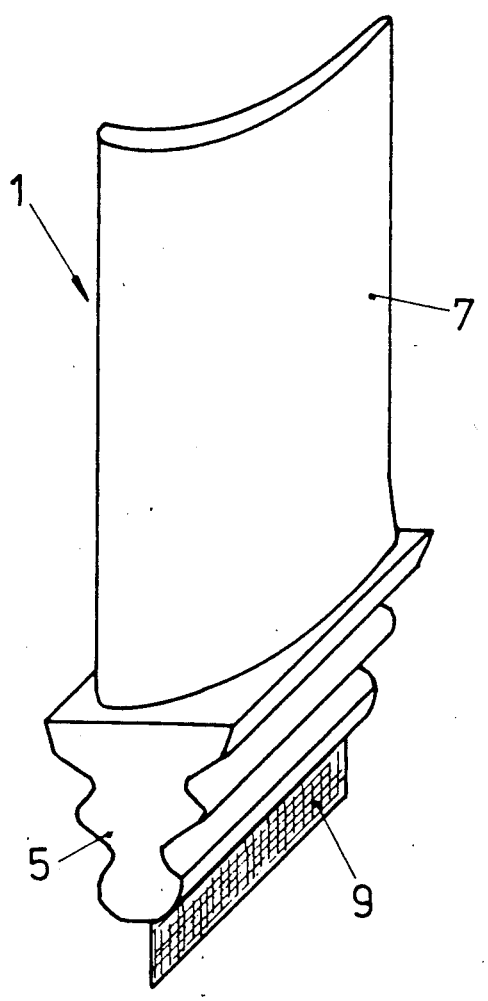
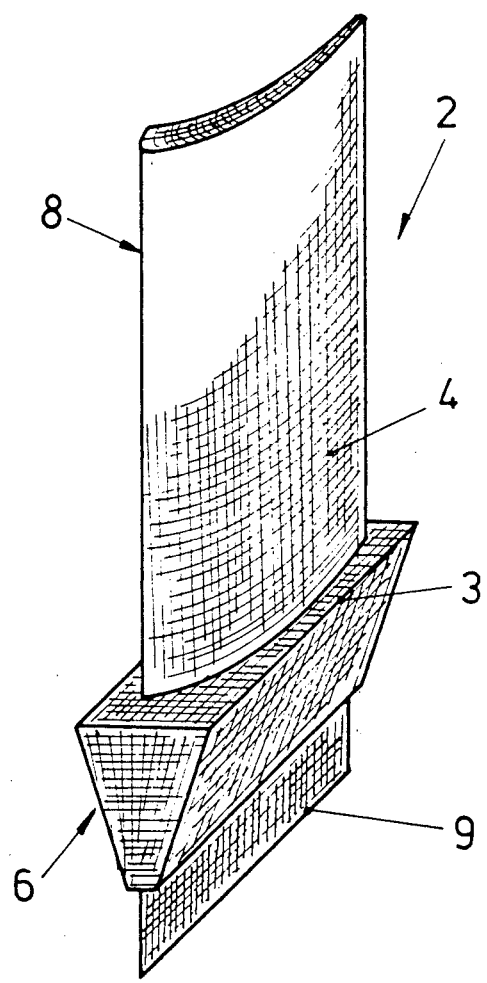

METHOD OF PRODUCING MOLDINGS

The invention relates to a method for producing moldings in the form of composite bodies, which include ceramic material, fired after a molding operation, and a reinforcement embedded in the ceramic material, the strength of which is greater than the strength of the ceramic material.

The German patent 440,745 describes a method for the production of moldings using a reinforcement formed by metal fabric, on which a ceramic material in an unfired paste form is spread. A disadvantage of this method is that such a ceramic paste is only able to penetrate a wire fabric with a comparatively coarse mesh. The fabric, thus, has to be very coarse and is not able to take on every desired fine configuration. In many cases it is thus not possible to provide the supporting skeleton with a geometry substantially adapted to the geometry of the molding and with a density which is properly related to the forces to be resisted. The overall strength which is obtainable in the known system is therefore limited. A further factor is that the wire of the metal fabric is melted during firing and then solidifies again. This involves changes in structure, which often lead to a loss in strength. Apart from this, the ceramic paste spread on the fabric is not able to be applied very densely so that there is an imperfect bonding with the support skeleton and this in turn means that the overall strength obtainable is also impaired. At the same time, in the method disclosured by the cited prior art there is also a lack of trueness. This is also due to the fact that the ceramic paste may be not be applied very densely so that during firing there is a considerable shrinkage. This disadvantage is made even more significant by the fact that the metal fabric forming the reinforcement is also changed in size by the change in structure due to firing. Apart from this the spreading of the ceramic paste is practically a modeling operation with which it is in any case not possible to obtain any great accuracy to size or trueness. A further shortcoming is to be seen in the fact that owing to the use of a ceramic paste the unfired blanks are insufficient in strength and are thus difficult to transport and therefore, there is a further reason for failure to keep to the desired dimensions.

In a further process as proposed in the German patent 1,181,114 for the production of refractory bricks, there is admittedly the use of pulverulent ceramic material, which is incorporated in a molding cavity containing the reinforcement in the form of sheet metal parts which, during the introduction of the ceramic material, practically have the effect of baffles so that it is not possible to fluidize the pulverulent ceramic material and to introduce it into the mold cavity. This is because the sheet metal parts forming the reinforcement would cause an excessive deflection and retardation. The ceramic material is accordingly only poured into the mold, cavity. In the case of complex molds as occur less in the case of refractory bricks and are more likely in the case of the production of parts of machines, there would thus be the danger of the mold cavity not being completely filled and the consequence of this would be a high reject quota. A further factor is that the metallic plates forming the reinforcement are only able to conform to a complicated configuration to an insufficient extent so that, in the case of complicated forms or molds, it would only be possible to reinforce the core part and not the marginal zones near to the surface. Apart from this it is to be assumed that the pieces of metal sheet used in this case would also melt during the firing operation so that there would be the same resultant disadvantages as regards to strength and loss of accuracy. This known method is thus quite unsuited to the production of machine components.

In the case of a further method as proposed in the German patent 2,048,358 of the initially mentioned type the reinforcement consists exclusively of short metal fibers, which have the basic ceramic material mixed with them even prior to the filling of the mold. However, in this case there is the danger that the metal fibers forming the reinforcement can be damaged even during the mixing operation. Furthermore it is not possible to prevent the reinforcement fibers from partly becoming exposed at the surface of the molding to be produced, this leading not only to a discontinuity in the ceramic surface but also to the fusion of the exposed metal fibers during firing so that the result is a rough, porous molding surface. A further fact is that owing to the practically even distribution of the metal fibers, it is not possible to ensure an enhanced reinforcement of selected parts of the cross section greater than in others. Apart from this the forces which may be transmitted by short metal fibers are strictly limited so that there is no substantial increase in the overall strength.

Taking this as a starting point the object of the present invention is thus the avoidance of the disadvantages of known processes and the provision of an improved method of the initially mentioned type which is such that during the production of machine components, it is not only possible achieve a high surface quality but also a systematic improvement in the strength and toughness in accordance with the likely loads.

This object is attained by the features recited in the accompanying claims.

The features of the invention completely overcome the disadvantages of the initially discussed prior art. The supporting skeleton fabricated of stiffened fiber mats leads to a self-supporting, three-dimensional structure, which not only involves the advantage of being able to be simply and accurately positioned but also ensures high tensile, flexural and torsional strength, this being due to the carbon fibers used, which have a very high inherent strength and increase such strength. A further factor is that in the case of the fiber mats used in the present which are able to be reinforced, it is possible to prduce practically any configuration. The supporting skeletons used in accordance with the invention thus have a geometry exactly in accordance with the geometry of the molding to be produced, this leading to the advantage of being able to achieve a high strength in all parts, such as projecting eyes, in the case of the production of complex machining parts. A further point is that it is possible to adapte the density of the fiber mats to the level of the forces to be expected. Thus it is possible to ensure an economic use of the material having the desired strength in every part of the structure. The features of the invention thus lead to an optimization both as regards the reinforcing effect possible and also as regards the consumption of material. The use of a reinforcing fiber array leads to the simultaneous advantage of structure which is pervious to a fluidized, pulverulent ceramic material. There is thus the advantage that pulverulent ceramic material may be blown into the mold cavity, for which purpose the pulverulent ceramic material is fluidized and it is caused to flow into all parts of the mold cavity. The result is thus an excellent filling of the mold cavity and a satisfactory density of the ceramic material and also an excellent embedding of the supporting skeleton forming the reinforcement and thus a good overall bonding effect. This in turn leads not only to a high degree of overall strength but also to excellent trueness and surface quality, since the good filling of the mold cavity means that there is no likelihood of substantial shrinkage or distortion during the firing operation. A further factor is that the blasting-filling method makes possible the use of very finely ground ceramic material and at the same time ensures that such material is drawn through the comparatively fine holes in the supporting skeleton in a reliable manner, this in turn meaning that the fiber mats may be made of a very fine fiber fabric, which may extend as far as the marginal zones of the cross sectional configuration without this being able to have an unfavorable effect of the possible degree of filling of the mold cavity with ceramic material. The possible fineness of the ceramic material made possible by the features of the present invention and the mesh size adjacent to the supporting skeleton thus complement each other for the purposes of obtaining a particularly high overall strength and trueness. A further beneficial effect of these features is to be seen in the fact that even the unfired blank has a comparatively high degree of strength, and this means that it is readily able to be transported. There is thus the advantageous effect of there being no danger of changes in size during transport of the blanks to the firing kiln. A further useful effect of the features of the invention is to be seen in the fact that the anchoring or mounting of the supporting skeleton in the mold in accordance with the invention, owing to the self-supporting properties of the supporting skeleton, may take place at one or two points, which may be so selected that the emergence, due to this, of the supporting skeleton from the ceramic material is not objectionable. At points removed from this point a continuous ceramic surface is ensured. The features of the invention thus make possible, for the first time, the economic production of complex machine parts able to resist high loads and to be made not only in small but also in large sizes.

Advantageous further developments of the invention will gathered from the subordinate claims.

Some embodiments of the invention will now be described with reference to the accompanying drawing.

FIG. 1 is a view of a turbine blade.

FIG. 2 is a view of the reinforcement of the turbine blade as shown in FIG. 1.

Figure 3:
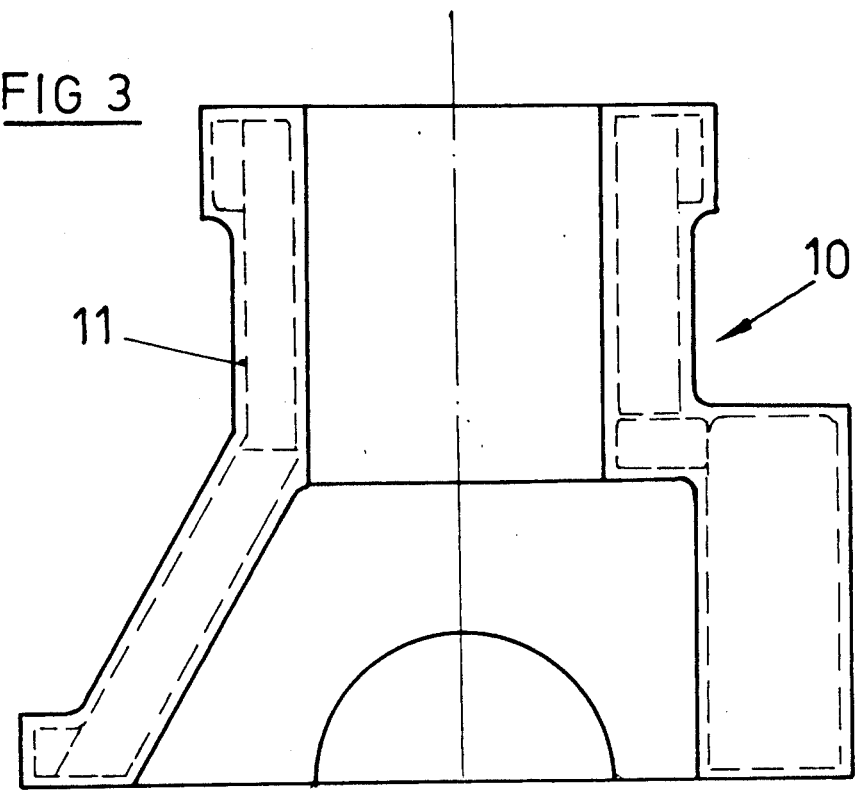
FIG. 3 is a section through a engine housing.

In order to avoid the expense of machining and in order to ensure a high surface quality, the turbine blade in accordance with FIG. 1 is in the form of a ceramic molding 1 which is produced without machining. In order to ensure the required high flexural and torsional strength the latter is provided with a reinforcement member, embedded in the basic ceramic material, such member having a tensile and flexural strength greater than the surrounding ceramic.

This reinforcement consists, as may be seen from FIG. 2, of a self-supporting, three-dimensional supporting skeleton 2, made in the form of a box, which in the present case is in the form of a reinforced fiber fabric or fiber array and thus has a high degree of strength as regards tension, compression, flexure and torsion. The basic material for the fiber fabric or fiber array may be in the form of carbon fibers, silicon fibers, glass fibers or the like. Carbon fibers are particularly suitable as regards their strength which is very much greater than that of other materials. The reinforcement of the fiber fabric or fiber array may be formed by a basic skeleton 3 of metal wire, etc., whose spaces are filled with fabric mats 4 of suitable fibers. The mats 4 may be firmly connected to the basic skeleton by bonding, welding, splicing or the like. Alternatively, or in addition to the mats 4 may be treated with a material in order to produce reinforcement. For this purpose the mats 4 may be impregnated with a resin such as epoxy resin or with a ceramic slip, which in the dried or fired condition acts as a reinforcement. It would also be possible however to make the supporting structure 2 exclusively or wire or rod material as a three-dimensional grating. The metal wire or rods used for forming the basic skeleton may be welded or brazed to each other. In the case of the use of rods or wire with a circular cross section there is a particularly low loss of ceramic cross-section.

The reinforcement member 2 forming the supporting skeleton will be seen to have a geometry conforming to that of the molding 1 to be produced. In the illustrated working example the supporting skeleton 2 possesses a downwardly tapering basic housing 6 associated with the downwardly tapered blade foot 5 and a twisted capping housing 8 associated with the twisted blade 7. The basic housing 6 and the capping housing 8 are in the present case, in the form of hollow members which are, set together and firmly joined to each other. However it would also be possible to have a longitudinally divided or integral design. The dimensions and the outline of the supporting skeleton 2 are such that its walls are substantially parallel on the surface to the surface of the molding 1 and are near to such surface. In the vicinity of the basic housing 6 associated with the foot this is only approximately the case, which as will clearly be seen, leads to a simplification of the geometry of the basic housing 6. In order nevertheless, to ensure a high degree of strength of the projections of the foot 5 not included in the basic housing 6, the ceramic material forming the foot 5 may have reinforcement fibers in the form of silicon carbide fibers or the like mixed with it. This may mean a slight impairment of the surface quality, but this is unimportant at the foot 5. As regards the blade, where a high surface quality is needed, there are no reinforcement fibers. The capping housing 7 thus exactly conforms to the surface form.

In the working example the mats 4 have the same mesh size over its entire area, since the molding 1 will be exposed to a very high load practically all over. In the case of moldings, which have parts with different loading, it would readily be possible to take this into account by a varying mesh size of the mats 4.

Figure 9:
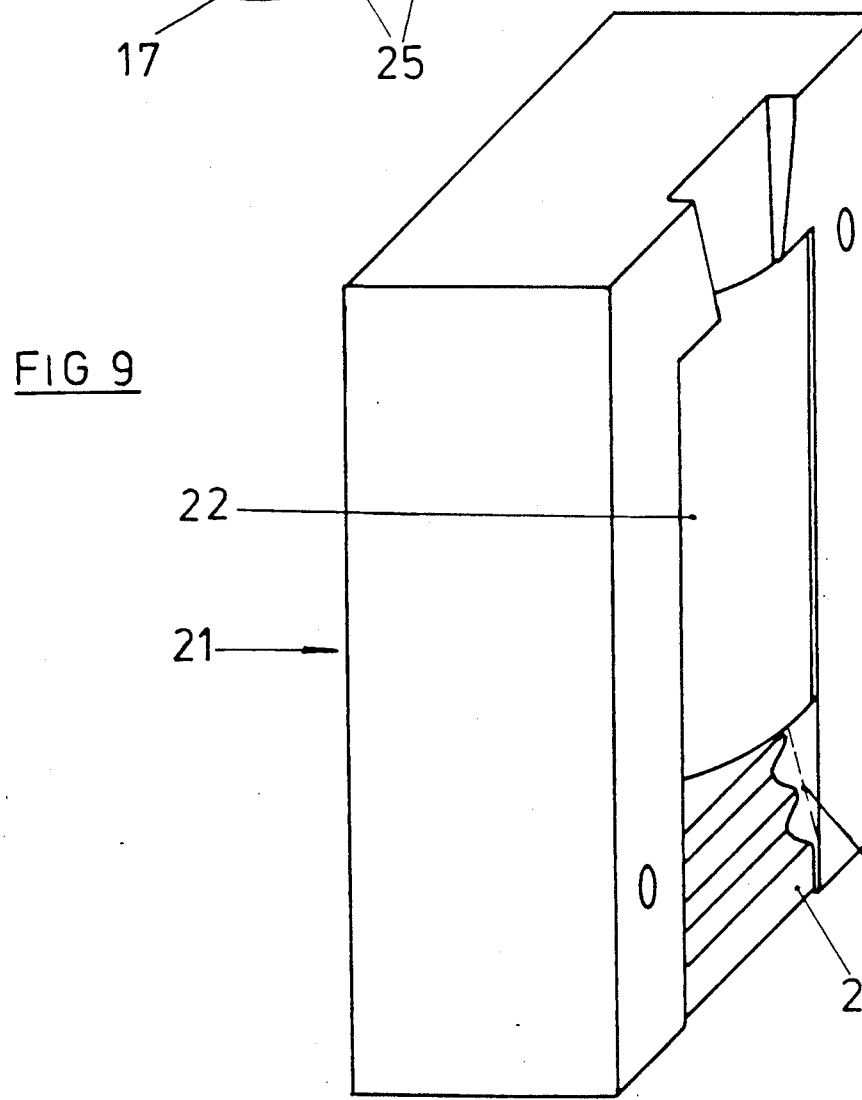
FIG. 9 is a view of the apparatus used for the production of the turbine blade as in FIG. 1 and/or of the reinforcement thereof as in FIG. 2.

The molding 1, which here is in the form of the turbine blade as illustrated, is produced by the firing of a blank. The blank is produced in a mold 21 as shown in FIG. 9, in whose cavity 22 the desired ceramic material is placed, in which the reinforcement is embedded in the form of the supporting skeleton. For this reason the supporting skeleton 2 is slidingly located prior to filling with the ceramic material, on the molding tool, that is to say anchored and mounted. For this purpose the supporting skeleton 2 is provided with one or more holders which, in the present case, are in the form of a holding strap 9, which may be gripped adjacent to the dividing gap 23 of the molding tool and which after production of the blank or after completion of the molding 1 is cut off. The holding strap 9, which initially necessarily extends out of the ceramic material and thus interrupts the ceramic material, is at a position which is not objectionable in this respect, that is to say in the present case adjacent to the lower end of the blade foot 5. In order to produce the supporting skeleton 2, the same mold 21 may be used as is used for the production of the blank, which in the present case is strengthened by inlays 24, as is indicated in the vicinity of the foot.

After the attachment of the stiff supporting structure 2 to the molding tool the remaining mold cavity 22 is filled with ceramic material, which penetrates through the mats 4 of the supporting skeleton. In this respect it may be a case of ceramic slip, but pulverulent granules are more particularly suitable which is fluidized by vacuum and may be introduced into the mold cavity, this facilitating the production of a complete filling. The filling of the mold cavity 22 may, as already indicated, be performed in steps such that firstly the foot 5 and then the blade 7 are molded with the use of different materials introduced into the mold. A vaccum is used for abruptly filling the mold cavity 22, that is to say evacuated so that the granules are moved from the granule container connected with the mold cavity and shot into the mold cavity 22. Then one or more shots may take place for filling with granules or making the filling denser. Isostatic compaction is found to be particularly suitable, in which the filling of the mold cavity is exposed to the same pressure on all sides so that an even filling and compaction of the ceramic granules takes place and it is, thus, possible to ensure a satisfactory engagement of the ceramic granules to the supporting skeleton 2. The fiber mats 4 may be seen to let through air and dust even if the mesh size is small so that in the case of the use of the vacuum method for filling the mold cavity 22 with pulverulent granules, satisfactory filling is ensured even if the mesh size is fine.

The blank so produced is placed in a kiln for firing. The firing operation may take place in the absence of air, that is to say under vacuum, so that any holding strap 9 with fibers extending out of the ceramic composition or fibers mixed in at the foot 5 are not able to oxidize; this being particularly desired in the case of the use of carbon fibers. After the termination of the firing operation the fired molding is cooled. In the case of the use of a skeleton 2, for instance with a basic skeleton 3 consisting of metal, the cooling stage is so performed that it corresponds to a normal annealing operation, the strength of the metallic components then being maintained. Since owing to the vacuum filling of the mold cavity 22 and the even compaction of the filling on firing, no substantial distortion is to be expected; the cooled molding does not need any fettling.

Figure 4:
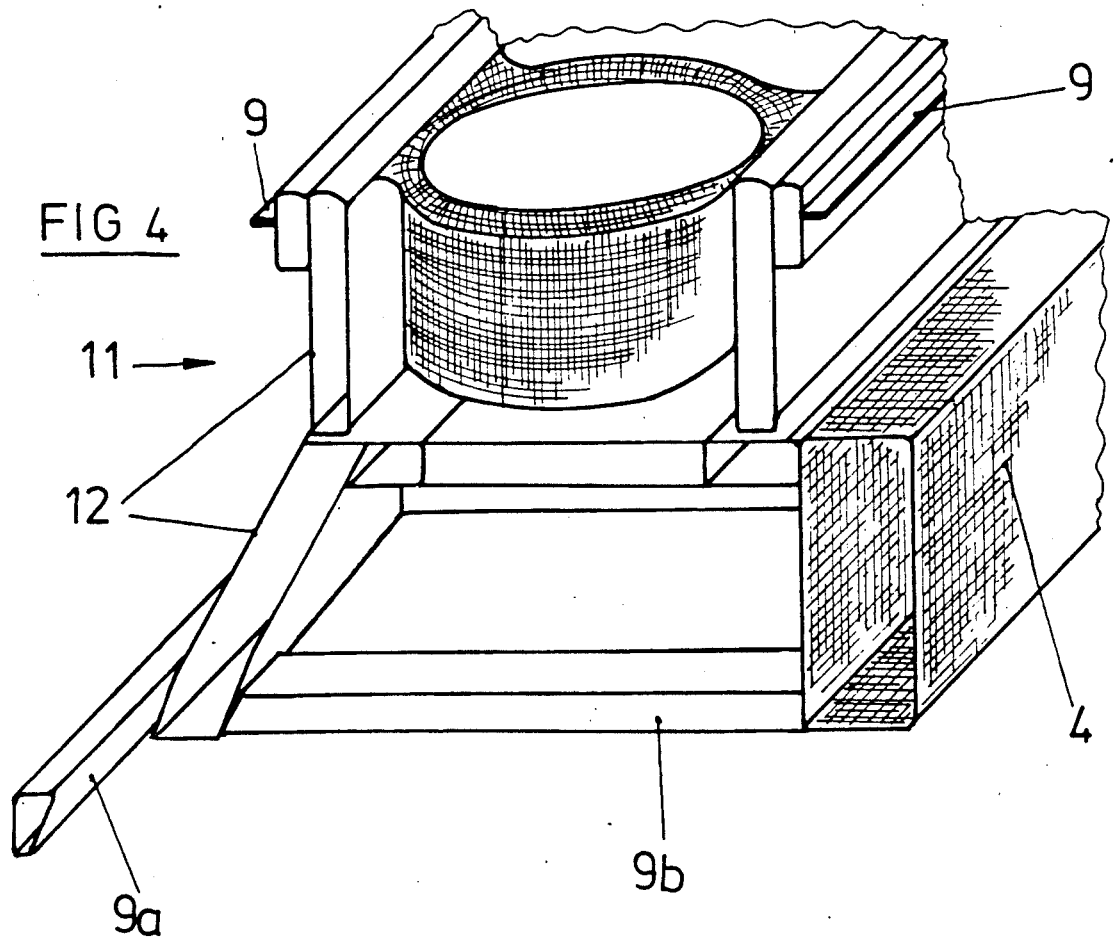
FIG. 4 is a view of the reinforcement of the engine housing in accordance with FIG. 3.

The design in accordance with the invention of the reinforcement as a self-supporting skeleton furthermore makes possible the production of large components of ceramic material. Accordingly, the engine block 10 shown in FIG. 3 is to be made in the form of a ceramic molding, which is provided with an embedded reinforcement in the form of a supporting skeleton 11 indicated by broken lines. As will best be seen from FIG. 4, this skeleton is here may of the form of a number of box girders 12. For the particular construction of the supporting skeleton 11, the remarks made above are also applicable. In order to anchor and mount the structure it is also possible to have holding straps 9, which may be arranged generally at the optional radiator water exit from the engine block. However it would also be readily possible to provide for such holding means by simply extending one or more stiff girders 12 in such a manner that the structure would be mounted and anchored in the mold as is indicated at 9a.

The engine block 10 is, as may be seen from FIG. 3, open in a downward direction. In the case of such moldings, in order to avoid distortion during firing, the associated supporting skeleton 11 may, as will be seen from FIG. 4, be provided with ties 9b extending across the open cross-section and which are removed from the finished molding. These ties are also suitable as holding means. For guarding the fiber material adjacent to the ties 9b against the access of oxygen there is in this part in all cases a treatment with a ceramic slip. The same applies for the extensions 9a provided to form holding means.

Figure 5:
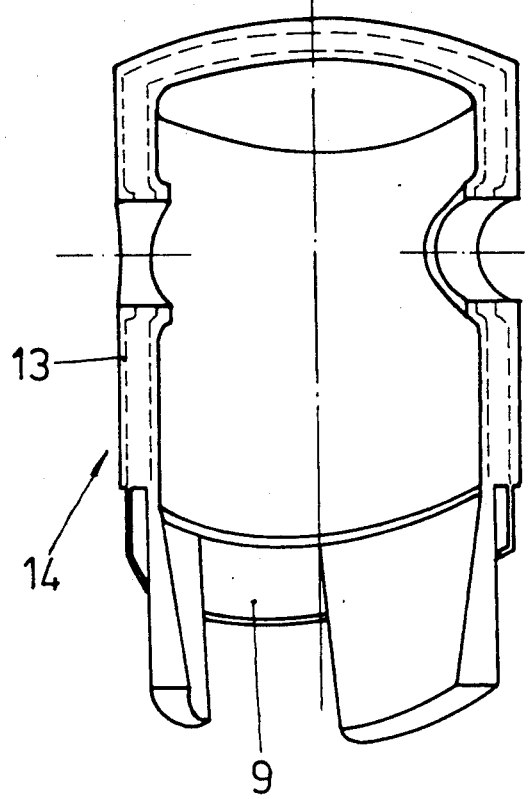
FIG. 5 is a section through a piston.
Figure 6:
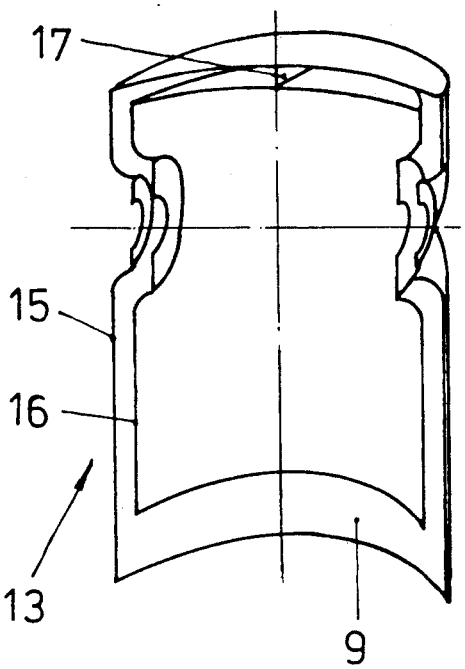
FIG. 6 is a longitudinal section taken through the reinforcement of the piston as seen in FIG. 5.

In the case of the reinforcement member shown in FIG. 6, it may be a question of a supporting skeleton 13 for the ceramic piston 14 to be seen in FIG. 5. The supporting skeleton possesses, as is indicated by broken lines in FIG. 5, a wall near to and parallel to the internal surface and which accordingly consists, as may best be seen from FIG. 6, of two pots 15 and 16 placed one within the other, which are able to be attached by distance strips 17 with a suitable distance between them so that in this case as well, the result is a stiff hollow member. The anchoring of this reinforcement member 13 to the molding tool may be adjacent to the lower end face of the skirt of the piston. In order to form the corresponding holding strap 9 in the illustrated working example of the invention the outer pot 15 is simply extended suitably in relation to the inner pot 16. In other respects the above remarks also apply for the design of the reinforcement member 13.

Figure 7A:
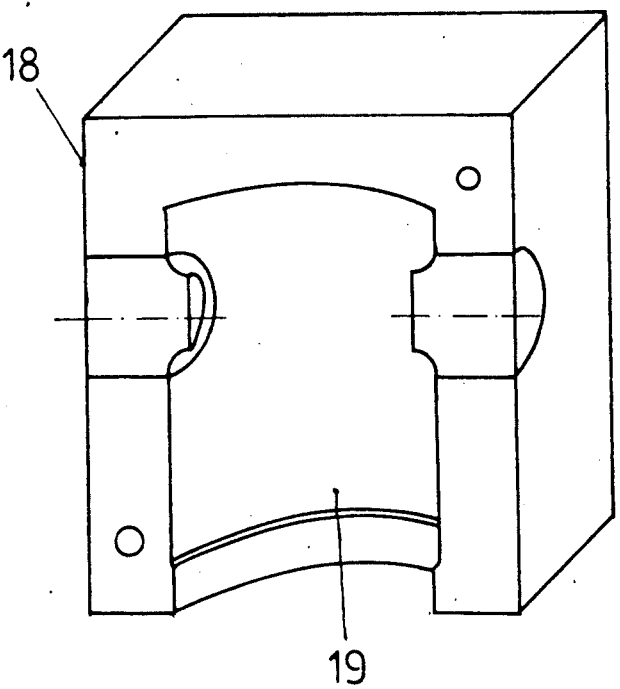
FIG. 7a and FIG. 7b are partial views of the apparatus necessary for producing the reinforcement as in FIG. 6.
Figure 7B:
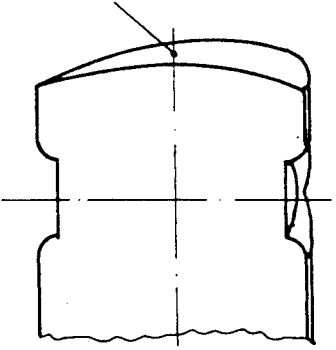
Figure 8:
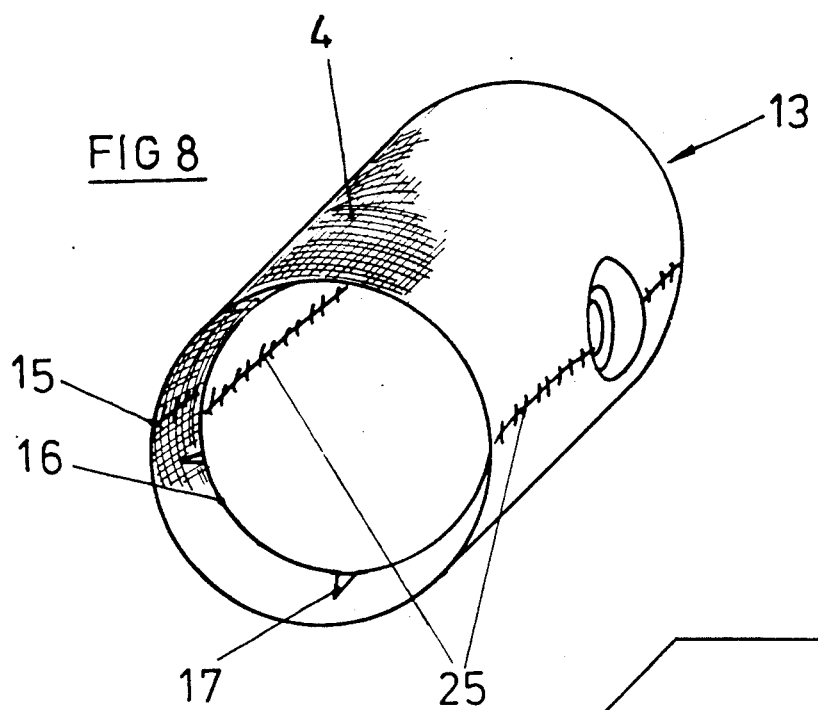
FIG. 8 is a perspective view of the reinforcement made up of two longitudinally divided halves put together as in FIG. 6 and used in the piston of FIG. 5.

The pots 15 and, respectively, 16 may be made in box-like tool, which is shown in FIGS. 7a and 7b. This tool accordingly consists of a box 18, as shown in FIG. 7a, with a mold cavity 19 and an insert 20, which may be fitted in the mold cavity 19. The mat is placed between the box 18 and insert 20 and then impregnated with a reinforcement material as, for instance, epoxy resin or a ceramic slip. In the case of a hollow girder of the present type the same is firstly made in two halves, which are then joined with each other, as is indicated in FIG. 8 by the connection seams 25. If in the finished component at the connecting seam 25 of the reinforcement member, no substantial forces have to be transmitted, the connection may be an adhesive bond, which does not have to resist the firing temperatures.

I claim:

1. A method for producing a molding in the form of a composite body, comprising the steps of:
    embedding a reinforcement in a ceramic material, said reinforcement having a strength which is greater than the strength of the ceramic material which comprises a rigid, three-dimensional supporting skeleton which is connected to reinforced fiber mats having, at least partially, carbon fibers with a structure which is pervious to the ceramic material and has a geometry which is adaptable to the geometry of the ceramic material;

anchoring and mounting said supporting skeleton into a mold cavity;

shooting the ceramic material, in a pulverulent condition, into the mold cavity by abruptly placing the mold cavity under vacuum; and, firing the ceramic material.

2. The method for producing a molding in the form of a composite body according to claim 1, wherein said shooting step is carried out by performing a plurality of blasting shots.

3. The method for producing a molding in the form of a composite body according to claim 1, further comprising the step of isostatic pressing prior to said firing step.

4. The method for producing a molding in the form of a composite body according to claim 1, wherein in said embedding step, the supporting skeleton of said reinforcement has a configuration which is, at least, substantially parallel to a surface of the molding.

5. The method for producing a molding in the form of a composite body according to claim 1, wherein in said embedding step, the supporting skeleton of said reinforcement has a wall form which is, at least, substantially near to a surface of the molding.

6. The method for producing a molding in the form of a composite body according to claim 1, wherein in said embedding step, the supporting skeleton of said reinforcement is in the form of at least one hollow member having an unbroken cross-section.

7. The method for producing a molding in the form of a composite body according to claim 1, wherein in said embedding step, the supporting skeleton of said reinforcement comprises reinforced holding means which is reinforced and protected against oxygen and is in the form of a holding strap.

8. The method for producing a molding in the form of a composite body according to claim 1, wherein in said embedding step, the supporting skeleton of said reinforcement comprises reinforced holding means which is reinforced and protected against oxygen and is in the form of a girder extension.

9. The method for producing a molding in the form of a composite body according to claim 1, wherein in said embedding step, the fiber mats are impregnated for reinforcement with ceramic slip, which is then dried or fired.

10. The method for producing a molding in the form of a composite body according to claim 1, wherein in said embedding step, the supporting skeleton of said reinforcement is produced in a box-like form.

11. The method for producing a molding in the form of a composite body according to claim 1, wherein in said embedding step, the supporting skeleton of said reinforcement comprises a stiff, three-dimensional grating serving as a basic skeleton for the fiber mats.

12. The method for producing a molding in the form of a composite body according to claim 11, wherein said three-dimensional grating is made of metal.

13. The method for producing a molding in the form of a composite body according to claim 11, wherein said three-dimensional grating includes rods having a round cross-section.

14. The method for producing a molding in the form of a composite body according to claim 11, wherein a cooling of the fired ceramic material corresponds to normal annealing for the material of said three-dimensional grating.

15. The method for producing a molding in the form of a composite body according to claim 11, wherein a cooling of said supporting skeleton of said reinforcement corresponds to normal annealing for the material of said three-dimensional grating.

16. The method for producing a molding in the form of a composite body according to claim 11, wherein the fiber mats exclusively contain carbon fibers.

17. The method for producing a molding in the form of a composite body according to claim 1, wherein the fiber mats include silicon fibers.

18. The method for producing a molding in the form of a composite body according to claim 1, wherein the fiber mats include glass fibers.

19. The method for producing a molding in the form of a composite body according to claim 1, wherein in said firing step, the ceramic material is fired in a vacuum kiln.

20. The method for producing a molding in the form of a composite body according to claim 1, wherein in said embedding step, the supporting structure of said reinforcement has an open cross-section which is provided with at least one tie bridging over the open cross-section, such tie being removed after firing.

21. The method for producing a molding in the form of a composite body according to claim 20, wherein said tie is impregnated with ceramic slip.

22. The method for producing a molding in the form of a composite body according to claim 1, wherein the ceramic material includes reinforcement fibers.

* * * * *